United States Patent Office.

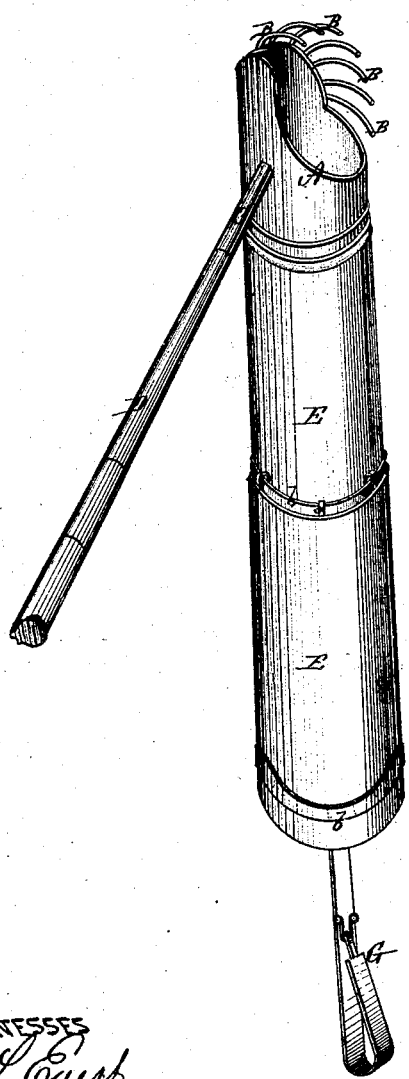

D. F. SLANE, OF CHILLICOTHE, OHIO.

Letters Patent No. 98,639, dated January 4, 1870.

IMPROVEMENT IN FRUIT-PICKER.

The Schedule referred to in these Letters Patent and making part of the same.

*To all whom it may concern:*

Be it known that I, D. F. SLANE, of Chillicothe, in the county of Ross, and in the State of Ohio, have invented certain new and useful Improvements in Fruit-Pickers; and do hereby declare that the following is a full, clear, and exact description thereof, reference being had to the accompanying drawings, and to the letters of reference marked thereon, making a part of this specification.

The nature of my invention consists in the construction and arrangement of a device for picking fruit, in whatever position the fruit may be found on the tree.

In order to enable others skilled in the art to which my invention appertains, to make and use the same, I will now proceed to describe its construction and operation, referring to the annexed drawing, which shows a perspective view of my improved fruit-picker.

A represents an inclined tube, with a curved opening at the upper end, with curved fingers B B fastened, in a curved form, to the back part of the tube.

The curve in the upper end of the tube A, and the curve formed by the fingers B B, make a circular opening to the front of the machine.

The tube A is, on its side, provided with a socket, C, in which the handle D is inserted, said handle being either in one piece, of any size desired, or of two or more pieces, spliced together.

At or around the lower end of the tube A, is secured the sleeve or conveyer E, which is made in sections, so as to be spliced to any length to suit the handle, and is used to convey the fruit to the hand, to be removed by the hand to the basket or sack.

The sleeve is spliced by hooks *a a*, sewed to the upper end of each section or splice, and which hook into a band, *b*, at the lower end of the section above.

A strap, G, is hooked into the band *b*, at the lower end of the sleeve, and is to be fastened around the wrist of the operator, to prevent it from swinging away from the hand.

By this device the fruit can be picked off the tree, in any position the fruit may hang.

Having thus fully described my invention,

What I claim as new, and desire to secure by Letters Patent, is—

The arrangement of the tube A, fingers B B, socket C, handle D, sleeve or conveyer E, hooks *a a*, bands *b b*, and strap, G, all substantially as specified.

In testimony that I claim the foregoing, I have hereunto set my hand, this 6th day of October, 1869.

D. F. SLANE.

Witnesses:
 WM. D. TRACY,
 CHARLES BLAIN.